Aug. 11, 1925.
A. A. KORN
1,548,843
TIRE
Filed June 5, 1922
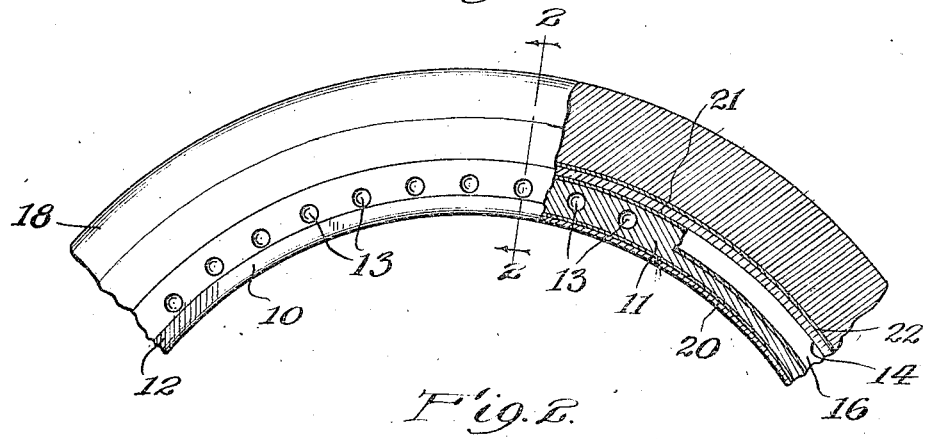
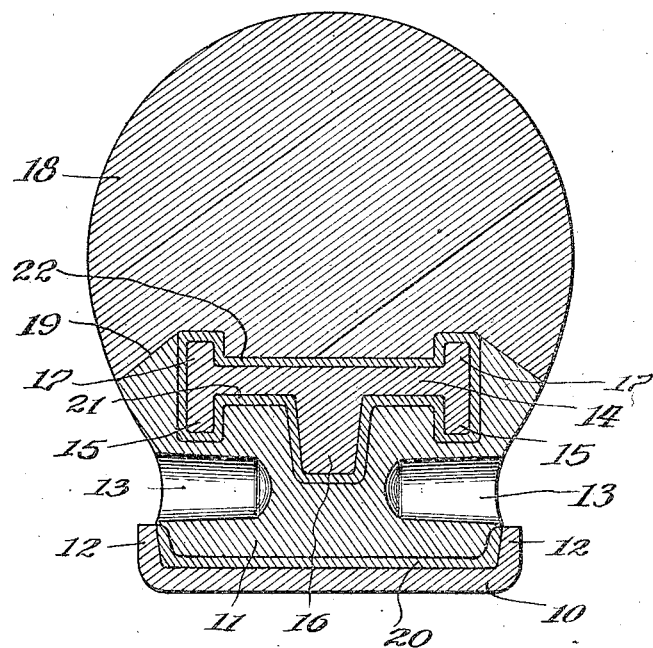
Inventor:
Alex A. Korn.
Emery, Booth, Janney & Varney
Attys.

Patented Aug. 11, 1925.

1,548,843

UNITED STATES PATENT OFFICE.

ALEX A. KORN, OF CHICAGO, ILLINOIS.

TIRE.

Application filed June 5, 1922. Serial No. 566,007.

*To all whom it may concern:*

Be it known that I, ALEX A. KORN, a citizen of the United States, and a resident of the city of Chicago, county of Cook, and State of Illinois, have invented an Improvement in Tires, of which the following is a specification.

This invention relates to tires and particularly to that class known as non-pneumatic or cushion tires and is intended to provide a structure contributing materially to the strength, durability, and efficiency, as well as to the shock-absorbing qualities of the tire.

The invention, as contemplated, is particularly adaptable for use in connection with motor vehicles, wherein is desired a structure capable of withstanding rough usage due to unfavorable road conditions and at the same time one possessing a certain resiliency for absorbing the shocks due to travel over uneven surfaces.

One illustrative embodiment of the invention is shown in the accompanying drawing, in which—

Fig. 1 is a side view, partly in section, of a portion of the tire and its associated parts.

Fig. 2 is a transverse section view taken on the line 2—2 of Fig. 1.

In the construction shown, an annular rim 10 is provided, which may be of any suitable construction capable of being secured, removably or otherwise, to the felly of a wheel. This rim represents an internal supporting member of the illustrative tire structure.

To provide a cushion for the load carried by the tire, a resilient cushioning element 11 may be placed around the rim 10, between a pair of parallel flanges 12, formed on the periphery of the rim adjacent its edges, and adapted to strengthen said rim and prevent lateral displacement of said element with reference thereto.

The cushioning element my be of any suitable material, as for example, a relatively soft, resilient rubber compound, and may be in the form of a continuous ring, as shown, or other suitable form providing a resilient element surrounding said rim.

To add to the resiliency of said cushioning element, there may be provided, at intervals, along the sides thereof, a plurality of recesses 13, the oppositely disposed pairs of which may be in axial alignment as shown, or, otherwise uniformly spaced around said element.

To protect the cushioning element and to stiffen and strengthen the tire and maintain it in proper form, there is provided a stiffening member or ring 14, of rigid metal construction or of other suitable material capable of resisting strains tending to collapse or distort the ring, and having its inner surface provided with side flanges 15 and an annular rib 16, adapted to strengthen said ring and to retain the latter in proper position with respect to said cushioning element.

The ring 14 may be provided on its periphery with a pair of annular flanges 17, forming the side walls of a channel adapted to receive a tread member 18 in a manner to retain said member in proper alignment with said ring.

The cushioning element 11, as shown in Fig. 2, may extend laterally beyond the ring 14 and outwardly along the sides thereof to a point indicated at 19 where it engages overhanging side portions of the tread member 18. Thus the ring 14 may be completely enclosed within the cushioning elements and tread member.

The tread member may be constructed of such rubber composition as is ordinarily used for such purposes, or of any other suitable wear-resisting material.

One object of the present invention is to provide a solid tread tire of comparatively great load-cushioning and shock absorbing capacity. This object is promoted by a construction and arrangement which permits utilization of practically the full extent of the annular cushioning member 11 for load-cushioning effect. For this purpose, said cushioning member 11 is so connected to the stiffening ring 14 and internal supporting member or wheel rim 10 as to suspend the rim resiliently from the stiffening ring above the axis of the wheel on which the tire is mounted, as well as to provide a cushioned support for the wheel rim below said axis, so that the axle load on the tire will be sustained through the cushioning member in the upper as well as the lower part of the wheel.

Such connection of the cushioning member to the stiffening ring and internal support or rim may be effectually established, continuously around the tire, by interposed connecting media represented by layers 20 and 21 of hard rubber which, by subjection to the ordinary vulcanizing process, will adhere securely to or unite with the soft rubber cushioning member 11 as well as the metallic members 10 and 14.

By thus uniting the cushioning member with the metallic parts, or in other words connecting the wheel rim 10 to the stiffening ring 14 through the medium of the cushioning member, the axle load on the wheel rim will be transmitted to the tire tread not only through the portion of the cushioning member below the axle but also by the portion of the cushioning member above the axle. This will be obvious by imagining the portion of the cushioning member in the lower half of the wheel to be removed, in which event the wheel rim would tend to drop under the axle load, but such dropping would be resisted by the upper portion of the cushioning member yieldingly suspending the wheel rim and load thereon from the stiffening ring 14. Likewise the cushioning of the load by compression of the cushioning member in the lower part of the wheel is accompanied by load-cushioning action in the upper part of the wheel through stressing or tensioning of the cushioning member. There being a secure connection of the cushioning member to the stiffening ring and wheel rim continuously around the tire, by the hard rubber layers vulcanized to the parts, the axle load carried by the tire is distributed practically throughout the length of the cushioning member, securing the full benefit of its shock absorbing capabilities.

The connection of the cushioning member with the stiffening ring and internal supporting member or rim 10 through the medium of the hard rubber layers 20 and 21, united with the parts by vulcanizing said layers as aforesaid, is of course of further advantage for strengthening and solidifying the tire structure and preventing relative displacement or separation of parts under lateral thrusts. For the same reasons, the external tread member 18 may be firmly secured to the stiffening ring 14 by a hard rubber layer 22, shown as forming in effect a continuation of the layer 21, and securely connected by vulcanization to said ring and tread member. In the process of vulcanizing the aforesaid parts, the abutting surfaces of the cushioning member and the tread member will be securely vulcanized to each other along the line 19.

Obviously the present invention is not limited to the particular embodiment shown in the drawings, since details of construction, form and arrangement may be variously modified to suit different requirements. Moreover, it is not indispensable that all of the features of the invention be used conjointly, since they may be used to advantage in various different combinations and sub-combinations.

I claim:

1. A vehicle tire comprising, in combination, a rubber tread member; a metallic stiffening ring; and an interposed hard rubber layer connected by vulcanization with said tread member and stiffening ring.

2. A vehicle tire comprising, in combination, a soft tread member; a metallic stiffening ring therefor; an internal metallic supporting member; an interposed rubber cushioning member; and hard rubber layers between the cushioning member and metallic parts and secured by vulcanization to said parts and to said cushioning member.

3. An article of the class described comprising, in combination, a rim adapted to be secured to the felly of a wheel; a solid rubber tread member surrounding said rim and spaced therefrom; an annular stiffening ring within said tread member; means comprising a layer of relatively hard rubber for vulcanizing said tread member to said ring; cushioning means of relatively soft rubber compound between said ring and said rim; and means comprising layers of relatively hard rubber for vulcanizing the said cushioning means to said rim and ring.

4. An article of the class described comprising, in combination, a rim having a channel formed on one side thereof; a ring having a plurality of channels formed thereon surrounding said rim and spaced therefrom; recessed cushioning means between said ring and rim and adapted to be received by the channel formed on the latter and certain of the channels on the former; means for securing said cushioning means to said rim and ring; a tread member surrounding said ring and adapted to be received by a channel thereon; and means for securing said tread member to said ring.

5. An article of the class described comprising, in combination, a rim; cushioning means surrounding said rim and secured thereto; a stiffening ring surrounding said cushioning means and partially embedded therein; a tread member surrounding said stiffening ring and vulcanized thereto and to said cushioning means.

In testimony whereof, I have signed my name to this specification.

ALEX A. KORN.